Patented Nov. 3, 1953

2,658,091

UNITED STATES PATENT OFFICE 2,658,091

PLASTICIZING RUBBER

Maynard F. Torrence, Woodstown, N. J., assignor to E. I. du Pont de Nemours and Company, Wilmington, Del., a corporation of Delaware No Drawing. Application January 22, 1952, Serial No. 267,703

10 Claims. (Cl. 260—761)

This invention relates to a process for plasticizing rubber, and to novel compositions for use in the plasticizing process.

Unvulcanized rubber can be rendered more plastic by mechanical working in the presence of air or oxygen, the degree of plasticity being usually determined by the time and temperature of the milling process. In order to reduce the time of milling and prevent deterioration of the rubber due to over-milling, a wide variety of chemical compounds can be added. Among the chemical softeners or plasticizing agents, generally referred to as "peptizing agents," are mercaptans both aromatic and aliphatic, and various heavy metal salts of these mercaptans such as disclosed in U. S. Patents 2,064,580, 2,378,519 and 2,467,789. More recently a new class of softening agents, which are di(ortho-acylaminoaryl) disulfides, has been disclosed in U. S. Patent 2,470,948 as softening or peptizing agents.

In the use of these chemical softening agents the rubber is plasticized without the addition of swelling agents, and lubricants or any of the other so-called "physical softeners" for rubber. In general, however, the chemical softening or peptizing agents are considerably more expensive than the "physical softeners" and it is therefore desirable to keep the amount of the chemical softener, required to effect the proper degree of plasticization, at a minimum.

It is therefore an object of this invention to provide a process for plasticizing rubber in which the amount of chemical plasticizing agent required is materially reduced from that heretofore employed. A further object of the invention is to provide a chemical plasticizing agent which will increase the plasticity of unvulcanized rubber when used in very small amounts, to give a rubber stock having good molding properties and extrusion characteristics.

As disclosed in U. S. Patent 2,470,948, a large group of di(ortho-acylaminoaryl) disulfides have been found to be excellent softening agents for natural rubber and for various synthetic rubbers when used in amounts varying from 0.5 part to 5.0 parts per hundred parts of rubber treated. I have found that when a very small amount of a nickel dithiocarbamate is employed with this same class of di(ortho-acylaminoaryl) disulfides the amount of the disulfide required to plasticize rubber can be greatly reduced while still obtaining the same degree of plasticity under otherwise the same milling conditions.

According to the present invention, from 0.001% to about 0.05% of a nickel salt of a mono- or di-substituted dithiocarbamic acid and from 0.01% to about 1.0% of the di(ortho-acylaminoaryl) disulfide, both based on the weight of the rubber to be plasticized, are incorporated in the unvulcanized rubber and the rubber is worked in the usual way until the desired degree of plasticity is obtained. The disulfide compounds and the nickel salt of the dithiocarbamic acid are preferably added as a previously prepared mixture, although these reagents may be added separately to the unvulcanized rubber during the conventional plasticizing process. The working of the unvulcanized rubber with the plasticizing agent is carried out at the usual temperatures of about 70° to 200° C. in mxers such as a Gordon Plasticator, Banbury mixer, Werner-Pfleiderer mixer, or on the conventional rubber mill.

The mixture of the di(ortho-acylaminoaryl) disulfides and the nickel salts of the dithiocarbamic acids may be made up in any ratio desired for use. Either simple mixtures of the dry ingredients with or without diluents, or mixtures of the same with other rubber compounding ingredients may be employed, or the mixtures may be employed as solutions in substantially neutral organic solvents such as hydrocarbons, alcohols and esters.

The di(ortho-acylaminoaryl) disulfides may be any of those disclosed in U. S. Patent 2,470,948, the preferred group being the di(2-aroylaminophenyl) disulfides, of which the 2,2'-dibenzamidodiphenyl disulfide is the preferred compound.

The nickel dithiocarbamates employed in the present invention are those which do not contain strongly acidic groups, and preferably those which are substantially neutral. One or both of the hydrogens on the nitrogen of each of the thiocarbamate groups may be replaced by hydrocarbon or substituted hydrocarbon radicals. The substituted hydrocarbon radicals may contain cyclic ethereal oxygen, secondary amino or hydroxyl groups. These hydrocarbons may be of the alkyl, olefinic, aryl or alicyclic series. The preferred class consists of those in which both hydrogens on the nitrogen atom have been replaced by hydrocarbon groups including the divalent hydrocarbon groups which, together with the nitrogen atom, form a heterocyclic ring. The nickel dialkyl dithiocarbamates in which the alkyl groups contain not more than 6 carbon atoms, is particularly preferred.

The proportions of the nickel salts ordinarily used will vary from about 0.01% to 0.05% based on the weight of the rubber, and the proportion of the disulfides usually employed will vary from about 0.05% to 0.5% based on the weight of the rubber, although larger or smaller amounts as given in the statement of invention give significantly improved results over the use of the disulfide alone. The amount of the mixture employed will depend upon the same factors that govern the time of milling required with the disulfide as the sole softening agent, such as the type of rubber being treated, the degree of softening desired and the effectiveness of the particular chemical used. In making up mixtures of these compounds for use in plasticizing rubber, from 10 to 100 parts of the nickel salts can conveniently be mixed with 100 parts of the disulfide, either with or without solid or liquid diluents.

While the nickel dithiocarbamates exhibit little or no plasticizing action by themselves when mixed with rubber, they greatly increase the plasticization action of the di(ortho-acylaminoaryl) disulfides, for, as illustrated in the following examples, only one-third of the normal amount of disulfide employed to produce a particular degree of plasticization is necessary when the very small amount of nickel salt is added.

The following examples are given to illustrate this invention. The parts and percentages employed are by weight, unless otherwise specified.

EXAMPLE

Thirty (30) parts of smoked sheet rubber are placed on a small (6" x 2") rubber mill and masticated for 3 minutes at 135° C. The agents to be tested were then added to the rubber in the quantity specified in the following tables (percentages are based on weight of rubber treated), and the mastication continued at 135° C. for 12 minutes. The plasticized rubber so obtained was removed as a sheet and folded. Plasticity pellets were cut from a sample of the plasticized polymer and the plasticity and recovery were measured on a Williams' parallel plate plastometer (Williams, Ind. Eng. Chem., 16, 362, 1924), following the procedure used in U. S. Patent 2,467,789. In the following tables, "P" is the plasticity number or thickness of the standard test pellet immediately after compression and is inversely proportional to the plasticity, and "R" is the measure of recovery of a sample after compressing force is removed, both of which are more fully explained in U. S. Patent 2,467,789.

Table I shows the effect of the concentration of the 2,2'-dibenzamidodiphenyl disulfide and nickel dibutyldithiocarbamate.

Table I

| Disulfide, percent | Nickel salt, percent | P | R |
|---|---|---|---|
| 0 | 0 | 187 | 70 |
| 0.05 | 0 | 189 | 82 |
| 0.10 | 0 | 146 | 58 |
| 0.15 | 0 | 140 | 33 |
| 0.05 | 0.01 | 124 | 18 |
| 0.05 | 0.03 | 79 | 2 |
| 0.03 | 0.05 | 92 | 3 |
| 0.05 | 0.05 | 82 | 2 |
| 0.10 | 0.05 | 85 | 2 |
| 0.15 | 0.05 | 69 | 0 |

Table II shows the effect of the concentration of the 2,2'-diacetamidodiphenyl disulfide and nickel dibutyldithiocarbamate.

Table II

| Disulfide, percent | Nickel salt, percent | P | R |
|---|---|---|---|
| 0.05 | 0 | 186 | 71 |
| 0.05 | 0.05 | 134 | 21 |
| 0.10 | 0 | 172 | 73 |
| 0.10 | 0.05 | 72 | 1 |

Table III shows the effect obtained from various nickel dithiocarbamates when used with 2,2'-dibenzamidodiphenyl disulfide. In each case 0.10% of the disulfide was employed, and 0.05% of the nickel dithiocarbamate. R' and R" indicate the substituents on the nitrogen of the thiocarbamate radical in the formula $(R'R''NCS_2)_2Ni$ Table III

| R' | R" | P | R |
|---|---|---|---|
| Methyl | Methyl | 68 | 1 |
| Ethyl | Ethyl | 70 | 1 |
| n-Propyl | n-Propyl | 72 | 1 |
| i-Propyl | i-Propyl | 53 | 1 |
| n-Butyl | n-Butyl | 76 | 2 |
| Allyl | Allyl | 58 | 1 |
| H | Phenyl | 68 | 1 |
| Ethyl | Phenyl | 60 | 0 |
| H | P-dodecylphenyl | 75 | 1 |
| H | P-diphenyl | 71 | 2 |
| H | Alpha-naphthyl | 74 | 2 |
| H | o-Chlorophenyl | 79 | 2 |
| R' and R" with the N is: Piperidine—(CH₂)₅—radical | | 63 | 0 |
| Morpholine—C₂H₄—O—C₂H₄—radical | | 67 | 1 |
| Control (no nickel salt) | | 138 | 20 |

Table IV shows the effect of the use of different temperatures during working and after the addition of the 2,2'-diacetamidodiphenyl disulfide and the nickel dibutyldithiocarbamate. In this table the milling time after the addition of the agents was 4.5 minutes in place of the 12 minutes specified in the example above.

Table IV

| Disulfide, percent | Nickel salt, percent | 70° C. | | 138° C. | |
|---|---|---|---|---|---|
| | | P | R | P | R |
| 0.25 | 0.0 | 156 | 19 | 127 | 10 |
| 0.25 | 0.05 | 117 | 7 | 80 | 2 |

Other nickel dithiocarbamates may be substituted for those used in the specific examples and in all cases they permit a material decrease in the amount of disulfide that is required to effect softening of the rubber. As further examples of the nickel salts, may be mentioned nickel cyclohexyl dithiocarbamate, nickel dicyclohexyl dithiocarbamate, nickel hexamethylene-bis (dithiocarbamate), nickel sec-butyl dithiocarbamate, nickel phenyl methyl dithiocarbamate, nickel 1-naphthyl dithiocarbamate, nickel 2-naphthyl dithiocarbamate, nickel (2-hydroxyethyl) dithiocarbamate, nickel-bis (2-hydroxyethyl) dithiocarbamate and nickel ethyl dithiocarbamate.

As mentioned above, any of the large list of di(ortho-acylaminoaryl) disulfides mentioned in U. S. Patent 2,470,948 as useful for the purpose of softening rubber, may be used as a softening agent, the effectiveness of which is materially increased by the use of the nickel salts as above illustrated for those specifically employed in the examples.

While it is pointed out above that, in preparing the mixture of nickel salts and disulfide, from 10 to 100 parts of the nickel salts can conveniently be mixed with 100 parts of the disulfide, where the much smaller amounts of the nickel salts are employed, as pointed out in the introductory part of the specification, the mixtures may be made with as low as 0.1 part of nickel salt to 100 parts of the disulfide, either with or without solid or liquid diluents.

I claim:

1. A process for improving the plasticity of unvulcanized rubber which comprises homogeneously incorporating into the rubber from 0.001% to 0.05% of a substantially neutral nickel dithiocarbamate and from 0.01% to about 1.0% of a di(ortho-acylaminoaryl) disulfide, both based on the weight of the rubber, and working the rubber until the desired degree of plasticity is obtained.

2. A process for improving the plasticity of unvulcanized rubber which comprises homogeneously incorporating into the rubber from 0.001% to 0.05% of a nickel dialkyldithiocarbamate and from 0.01% to about 1.0% of di(ortho-aroylaminoaryl) disulfide, both based on the weight of the rubber, and working the rubber until the desired degree of plasticity is obtained.

3. A process for improving the plasticity of unvulcanized rubber which comprises homogeneously incorporating into the rubber from 0.001% to 0.05% of nickel dibutyl dithiocarbamate and from 0.01% to about 1.0% of 2,2'-dibenzamidodiphenyl disulfide, both based on the weight of the rubber, and working the rubber until the desired degree of plasticity is obtained.

4. A process for improving the plasticity of unvulcanized rubber which comprises homogeneously incorporating into the rubber from 0.01% to 0.05% of a substantially neutral nickel dithiocarbamate and from 0.05% to 0.5% of a di(ortho-acylaminoaryl) disulfide, both based on the weight of the rubber, and working the rubber until the desired degree of plasticity is obtained.

5. A process for improving the plasticity of unvulcanized rubber which comprises homogeneously incorporating into the rubber from 0.01% to 0.05% of a nickel dialkyldithiocarbamate and from 0.05% to 0.5% of di-ortho-aroylaminoaryl) disulfide, both based on the weight of the rubber, and working the rubber until the desired degree of plasticity is obtained.

6. A process for improving the plasticity of unvulcanized rubber which comprises homogeneously incorporating into the rubber from 0.01% to 0.05% of nickel dibutyl dithiocarbamate and from 0.05% to 0.5% of 2,2'-dibenzamidodiphenyl disulfide, both based on the weight of the rubber, and working the rubber until the desired degree of plasticity is obtained.

7. A composition for plasticizing rubber, comprising 0.1 part to 100 parts of a substantially neutral nickel dithiocarbamate and 100 parts of a di(ortho-acylaminoaryl) disulfide.

8. A composition for plasticizing rubber, comprising 10 parts to 100 parts of a substantially neutral nickel dithiocarbamate and 100 parts of a di(ortho-acylaminoaryl) disulfide.

9. A composition for plasticizing rubber, comprising 10 parts to 100 parts of a nickel dialkyl dithiocarbamate and 100 parts of di(ortho-aroylaminoaryl) disulfide.

10. A composition for plasticizing rubber, comprising 10 parts to 100 parts of nickel dibutyl dithiocarbamate and 100 parts of 2,2'-dibenzamidodiphenyl disulfide.

MAYNARD F. TORRENCE.

References Cited in the file of this patent

UNITED STATES PATENTS

| Number | Name | Date |
|---|---|---|
| 2,132,505 | Williams | Oct. 11, 1938 |
| 2,184,238 | Lighty | Dec. 19, 1939 |
| 2,470,948 | Paul | May 24, 1949 |
| 2,546,083 | Barton | Mar. 20, 1951 |

OTHER REFERENCES

Du Pont's Report No. 49-1 of February 1949 on N. B. C., pages 4-6.